United States Patent
He et al.

(10) Patent No.: US 11,372,887 B2
(45) Date of Patent: Jun. 28, 2022

(54) METHOD, DEVICE AND COMPUTER PROGRAM PRODUCT FOR PROVIDING VISUAL REPRESENTATION

(71) Applicant: EMC IP Holding Company LLC, Hopkinton, MA (US)

(72) Inventors: Zheng He, Shanghai (CN); Zhipeng Zhang, Shanghai (CN); Zhe Yang, Chengdu (CN); Yao Chen, Chengdu (CN); Binbin Deng, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 54 days.

(21) Appl. No.: 16/890,327

(22) Filed: Jun. 2, 2020

(65) Prior Publication Data
US 2021/0026865 A1 Jan. 28, 2021

(30) Foreign Application Priority Data
Jul. 24, 2019 (CN) .......................... 201910672463.5

(51) Int. Cl.
| | |
|---|---|
| *G06F 16/27* | (2019.01) |
| *G06F 16/28* | (2019.01) |
| *G06F 16/16* | (2019.01) |
| *G06F 11/30* | (2006.01) |
| *G06F 16/182* | (2019.01) |

(52) U.S. Cl.
CPC .......... *G06F 16/27* (2019.01); *G06F 11/3034* (2013.01); *G06F 16/168* (2019.01); *G06F 16/1827* (2019.01); *G06F 16/284* (2019.01)

(58) Field of Classification Search
CPC ........... G06F 16/24575; G06F 16/9535; G06F 3/04815; G06F 9/5072; G06F 16/285
See application file for complete search history.

(56) References Cited

U.S. PATENT DOCUMENTS

| | | | |
|---|---|---|---|
| 7,783,651 B2* | 8/2010 | Muscarella | ......... G06F 16/9027 707/756 |
| 9,280,555 B1 | 3/2016 | Bono et al. | |
| 9,305,009 B1 | 4/2016 | Bono et al. | |
| 9,330,155 B1 | 5/2016 | Bono et al. | |
| 9,378,219 B1 | 6/2016 | Bono et al. | |
| 9,805,105 B1 | 10/2017 | Bono et al. | |
| 9,880,777 B1 | 1/2018 | Bono et al. | |
| 9,881,014 B1 | 1/2018 | Bono et al. | |

(Continued)

*Primary Examiner* — Angelica Ruiz
(74) *Attorney, Agent, or Firm* — BainwoodHuang

(57) ABSTRACT

Techniques, which provide visual representations, involve displaying, in a first display area, a plurality of first visual representations indicating a plurality of storage nodes in a storage system, the plurality of storage nodes in the storage system having data replication relations, and the data replication relations including: replication of first data at a first storage node to one or more second storage nodes, and/or replication of second data at one or more second storage nodes to the first storage node. The techniques further involve displaying, in the first display area, a plurality of second visual representations indicating a plurality of data replication relations between the plurality of storage nodes. Accordingly, respective storage nodes in the storage system in a topology view can be visualized, and data replication relations between the respective storage nodes can be clearly described.

18 Claims, 9 Drawing Sheets

(56) References Cited

U.S. PATENT DOCUMENTS

| | | | |
|---|---|---|---|
| 10,037,251 B1 | 7/2018 | Bono et al. | |
| 10,289,690 B1 | 5/2019 | Bono et al. | |
| 10,747,465 B2 | 8/2020 | Shang et al. | |
| 10,809,922 B2 | 10/2020 | Zhang et al. | |
| 2007/0100961 A1* | 5/2007 | Moore | G06F 9/5072 709/217 |
| 2013/0250952 A1* | 9/2013 | Feng | H04L 67/10 709/203 |
| 2014/0129936 A1* | 5/2014 | Richards | G06F 16/9024 715/716 |
| 2015/0278273 A1* | 10/2015 | Wigington | G06F 16/185 707/797 |
| 2018/0260125 A1* | 9/2018 | Botes | G06F 16/275 |

\* cited by examiner

FIG. 1

| More Actions | | | | | | | |
|---|---|---|---|---|---|---|---|
| Source (110, 120) | | Resource Type (130) | Replication Mode (140) | Destination (150, 160) | | State (170) | Name (180) |
| System | Resource | | | System | Resource | | |
| Local System | Consistency Group2 | Consistency Group | Asynchronous | Chengdu | Consistency Group2 | Auto Sync Configured | Rep_Session_87 |
| Local System | Lun 0 | LUN | Manual | Beijing | Lun 0 | Idle | Rep_Session_80 |
| Local System | Vmware-NFS-1(nas_01) | Vmware(NFS) | Asynchronous | Chengdu | Vmware-NFS-1(nas_01) | Active | Rep_Session_49 |
| Local System | Vmware-NFS-1(nas_01) | Vmware(NFS) | Synchronous | New York | Vmware-NFS-1(nas_01) | Lost Communication | Rep_Session_73 |

| More Actions | 210: Pause / Resume / Sync / Failover / Failover with sync / Failback / Preserve async replication | | | | | | | |
|---|---|---|---|---|---|---|---|---|
| System | | | Type | Replication Mode | Destination | | State | Name |
| | | | | | System | Resource | | |
| Local System | | | ency Group | Asynchronous | Chengdu | Consistency Group2 | Auto Sync Configured | Rep_Session_87 |
| Local System | | | | Manual | Beijing | Lun 0 | Idle | Rep_Session_80 |
| Local System | Vmware-NFS-1(nas_01) | Vmware(NFS) | | Asynchronous | Chengdu | Vmware-NFS-1(nas_01) | Active | Rep_Session_49 |
| Local System | Vmware-NFS-1(nas_01) | Vmware(NFS) | | Synchronous | New York | Vmware-NFS-1(nas_01) | Lost Communication | Rep_Session_73 |

FIG. 2

METHOD, DEVICE AND COMPUTER PROGRAM PRODUCT FOR PROVIDING VISUAL REPRESENTATION

CROSS-REFERENCE TO RELATED APPLICATION

This application claims priority to Chinese Patent Application No. CN201910672463.5, on file at the China National Intellectual Property Administration (CNIPA), having a filing date of Jul. 24, 2019, and having "METHOD, DEVICE AND COMPUTER PROGRAM PRODUCT FOR PROVIDING VISUAL REPRESENTATION" as a title, the contents and teachings of which are herein incorporated by reference in their entirety.

FIELD

Embodiments of the present disclosure relate to the field of data storage, and more particularly, to method, device and computer readable media for providing visual representations of data replication relations.

BACKGROUND

Data storage systems generally use replication solutions to protect their stored data. Traditional replication solutions can perform synchronous replication or asynchronous replication, which allows users to replicate data locally within a storage node in a storage system or remotely replicate data to other storage nodes in the storage system. Having remote copies of the data protects the user against influences of the primary storage node interruption and allows the user to restore quickly and easily on a target storage node with minimal data loss or no data loss depending on the selected replication method. Session replications can be configured and managed by management software at the storage nodes and a plurality of storage nodes in the storage system also can be monitored using centralized management software.

With the development of data storage technology, data replications between massive storage nodes in the storage system are supported, as well as advanced replication functions, such as cascaded replication or 1:N fan out replication configuration. Accordingly, the user needs to quickly know all the remote replication sessions configured for the storage resources of the plurality of storage nodes in the storage system, as well as the states on the replication links and the operations being performed, so as to effectively manage the remote sessions of the storage nodes and avoid performing conflicting operations on different storage nodes simultaneously. However, existing management software only supports management of a single storage node. Moreover, centralized management software only remotely monitors states, activities and resources on the registered storage nodes. Therefore, replication configuration and management lacks a straightforward overview of all storage nodes and storage resources participating in replications in the storage system. As a result, when the storage system is composed of a plurality of storage nodes, the user must acquire the replication relations of a single storage node from each individual storage node, and then summarize the replication relations between a plurality of storage nodes in the entire storage system. Hence, when there are massive storage nodes in the storage system and the replication configurations are performed across storage resources on a plurality of storage nodes, it is very time-consuming and error-prone to acquire the replication relations between a plurality of storage nodes in the entire storage system.

SUMMARY

In general, embodiments of the present disclosure provide a solution of providing visual representations of data replication relations.

In a first aspect of the present disclosure, a method of providing visual representations of data replication relations is provided. The method includes displaying, in a first display area, a plurality of first visual representations indicating a plurality of storage nodes in a storage system, the plurality of storage nodes in the storage system having data replication relations, and the data replication relations including: replication of first data at a first storage node of the plurality of storage nodes to one or more second storage nodes of the plurality of storage nodes, and/or replication of second data at one or more second storage nodes of the plurality of storage nodes to the first storage node. The method also includes displaying, in the first display area, a plurality of second visual representations indicating a plurality of data replication relations between the plurality of storage nodes.

In a second aspect of the present disclosure, an apparatus of providing visual representations of data replication relations is provided. The apparatus includes a processor and a memory coupled to the processor, the memory having instructions stored therein. The instructions, when executed by a processor, cause the apparatus to perform acts. The acts include: displaying, in a first display area, a plurality of first visual representations indicating a plurality of storage nodes in a storage system, the plurality of storage nodes in the storage system having data replication relations, and the data replication relations including: replication of first data at a first storage node of the plurality of storage nodes to one or more second storage nodes of the plurality of storage nodes, and/or replication of second data at one or more second storage nodes of the plurality of storage nodes to the first storage node. The acts further include displaying, in the first display area, a plurality of second visual representations indicating a plurality of data replication relations between the plurality of storage nodes.

In a third aspect of the present disclosure, there is provided a computer storage medium having computer-readable instructions stored thereon. The computer-readable instructions, when executed, cause a device to perform the method according to the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objects, features, and advantages of the present disclosure will become more apparent, wherein the same reference signs usually denote the same components in the example embodiments of the present disclosure.

FIG. 1 illustrates a schematic diagram of an example replication session table in an interface of an existing management software at a single storage node;

FIG. 2 illustrates a schematic diagram of an example replication operation menu in an interface of an existing management software at a single storage node;

DETAILED DESCRIPTION OF EMBODIMENTS

Figure 3:
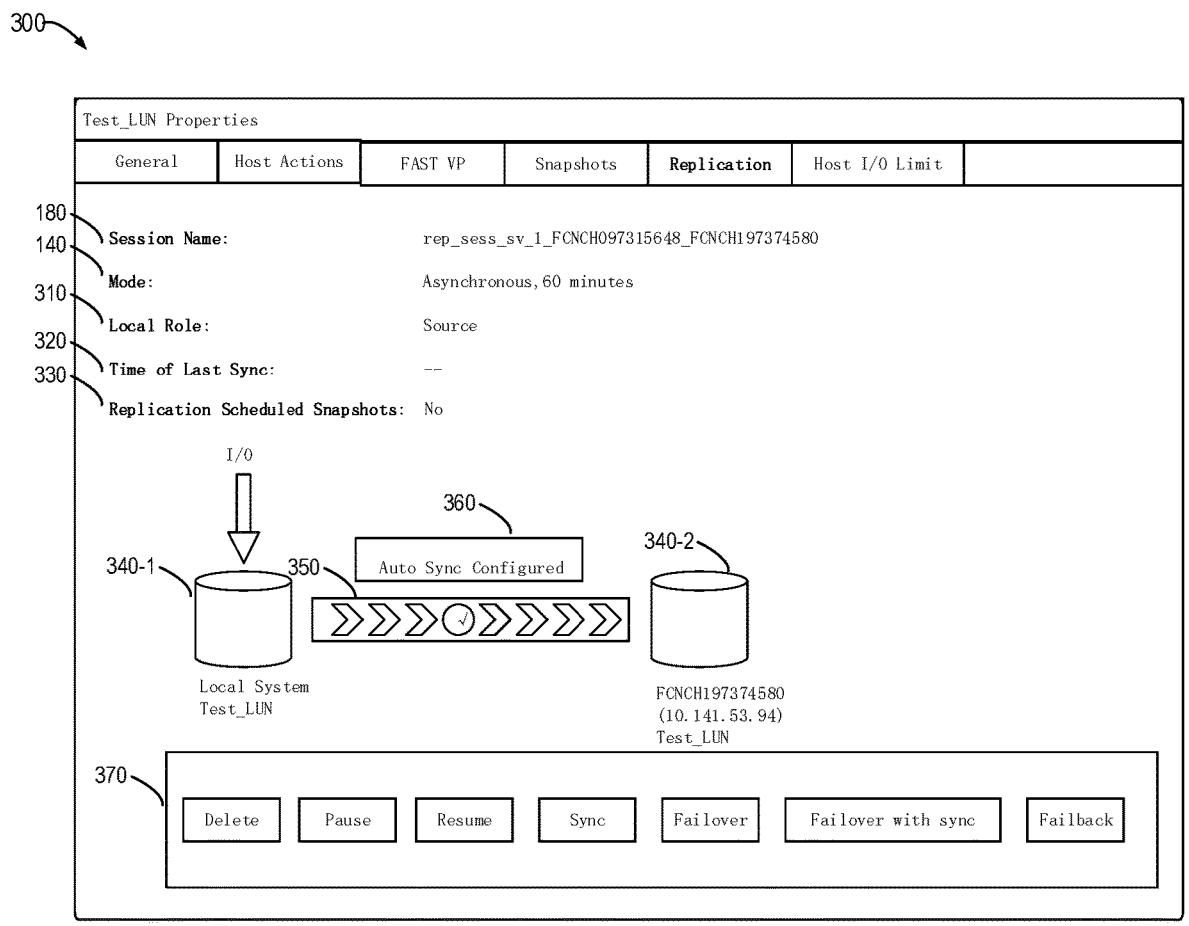
FIG. 3 illustrates a schematic diagram of a replication session on an example storage resource property dialog in an interface of an existing management software at a single storage node.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more details below with reference to the drawings. Although some embodiments of the present disclosure are shown in the drawings, it should be appreciated that the present disclosure may be implemented in various forms and should not be interpreted as limited to the embodiments set forth herein. On the contrary, the embodiments are provided to understand the present disclosure in a more thorough and complete way. It should be appreciated that drawings and embodiments of the present disclosure are provided only for the purpose of examples rather than limiting the protection scope of the present disclosure.

In the descriptions of the embodiments of the present disclosure, the term "includes" and its variants are to be understood as open-ended terms, that is, "including but not limited to." The term "based on" is to be understood as "based at least in part on." The term "one embodiment" or "this embodiment" is to be understood as "at least one embodiment." The terms "first", "second" and so on can refer to different or same objects. Other explicit and implicit definitions may also be included below.

As described above, users can configure and manage session replications through management software at respective storage nodes. Such management software can provide a simple and intuitive interface that not only allows users to configure and manage their replication settings, but also provides a visual representation of the configuration.

FIG. 1 illustrates an example replication session table 100 in an interface of an existing management software at a single storage node. The replication session table 100 respectively displays source storage node name 110, source storage resource name 120, source storage resource type 130, replication mode 140, destination storage node name 150, destination storage resource name 160, state 170, session name 180, and the like of all replication sessions on the storage node. The source storage node name 110 and the destination storage node name 150 indicate that the replication session is replicated from a source storage node to a destination storage node, for example, the replication session is replicated from a local system to Chengdu, Beijing or New York, etc. The storage resource type 130 may include, for example, file system, Logical Unit Number (LUN), Consistency Group, NAS Server or VMware (NFS), and the like. The replication mode 140 may include "synchronous" replication and "asynchronous" replication, wherein the "synchronous" replication refers to replicating data to destination storage resources on the destination storage nodes in real time in response to arrival of an read write (I/O) request. In contrast, the "asynchronous" replication periodically replicates data to the destination storage nodes on demand and/or replicates data to destination storage resources on the destination storage nodes in response to specific events. Therefore, the "asynchronous" replication also can further include an automatic asynchronous replication and "Manual," where the automatic asynchronous replication represents an automatic synchronous configuration, i.e., periodically and automatically replicating the data to the destination storage nodes and "Manual" represents manual, i.e., the user manually triggers the replication of the data to the destination storage nodes. The state 170 indicates a state of a data replication link of the replication session between the source storage node and the destination storage node. For example, the state 170 can include "OK," "Idle," "Active," "Auto Sync Configured" and "Lost Sync communication", etc.

On the basis of FIG. 1, FIG. 2 further illustrates an example replication operation menu 200 in an interface of existing management software at a single storage node. The replication operation menu 200 indicates how to manage the replication sessions on the storage node in the interface of the existing management software. Users can perform different operations on the replication sessions by selecting different acts 210, for example, the acts 210 can include suspending replication, restoring replication, replication trigger in the "asynchronous" replication and operation associated with switchover and restoration between production nodes and backup nodes, etc.

FIG. 3 illustrates a replication session 300 on an example storage resource property dialog in an interface of existing management software at a single storage node. FIG. 3 illustrates how to visualized and manage replication sessions in the LUN properties on the storage resource dialog in the interface of the existing management software. Session name 180, replication mode 140, local role 310, time of last synchronization 320 and replication schedule snapshot 330 can be displayed under an Replication entry in the storage resource dialog. For example, in FIG. 3, the replication mode 140 indicates an asynchronous mode and a period is 60 minutes; the local role 310 indicates source, i.e., the data is replicated from a local storage node to a further destination storage node; the time of the last synchronization 320 is denoted as "—," which means that data synchronization has not occurred yet; the replication schedule snapshot 330 is indicated as "No," which indicates that the schedule snapshot is not replicated to the destination storage node. In addition, a visual representation 340-1 indicating a source storage node of the session replication, a visual representation 340-2 indicating a destination storage node of the session replication, a visual representation 350 indicating a data replication relation between the source storage node and the destination storage node and a visual representation 360 indicating a state 170 of a data replication link are also displayed at the bottom of the storage resource dialog. A visual representation 370 indicating the acts 210 performed on the session replication is also displayed at the bottom of the storage resource dialog.

As described above, the user can also monitor a plurality of storage nodes in the storage system using centralized management software. The plurality of storage nodes in the storage system can be registered into the centralized management software, which enables the centralized management software to obtain aggregated states, alerts, host details, performance and capacity metrics, and storage usage information from the plurality of storage nodes. This allows an administrator to quickly view the entire storage environment and quickly access storage nodes which need attention and maintenance.

The inventors noticed that the replication configuration and management in the existing management software is quite simple, providing only limited replication relationship visualization. First of all, the management software on the existing storage nodes only manages the replication sessions on a single storage node, and the replication configuration and management lacks an overall visualization of all storage nodes and storage resources participating in the joint replication. Therefore, when there are massive storage nodes in the storage system and support complicated replication functions between the storage nodes, the user must find out, from the replication session table of each storage node, replication relation of each storage node, and then manually summarize the replication relations between the plurality of storage nodes in the storage system. This takes a long time and the manual work is error-prone.

Furthermore, the inventors also noticed that the existing centralized management software only monitors the basic information of a plurality of storage nodes in the storage system without providing session replication information of the plurality of storage nodes. Therefore, when there are massive storage nodes in the storage system and support complicated replication functions between the storage nodes, it is also difficult to provide the user with the replication relations between a plurality of storage nodes in the entire storage system. Hence, the inventors propose that a topology view is provided in the centralized management software to visualize a plurality of storage nodes configured with replications in the storage system and the replication relations between them. This topology view can clearly describe the replication relations between the plurality of storage nodes, which can improve efficiency and accuracy of data replication management.

In accordance with embodiments of the present disclosure, a solution of providing visual representations of data replication relations is presented. The solution enables the centralized management software to monitor all remote replication sessions configured for storage resources of a plurality of storage nodes in the storage system and to visualize the relations between the respective storage nodes in a more user-friendly topology view. In this way, the solution can provide users with a high-level perspective to quickly understand the replication configuration across storage nodes in the storage system, so as to enhance efficiency and accuracy of data replication management across the storage nodes.

Figure 4:
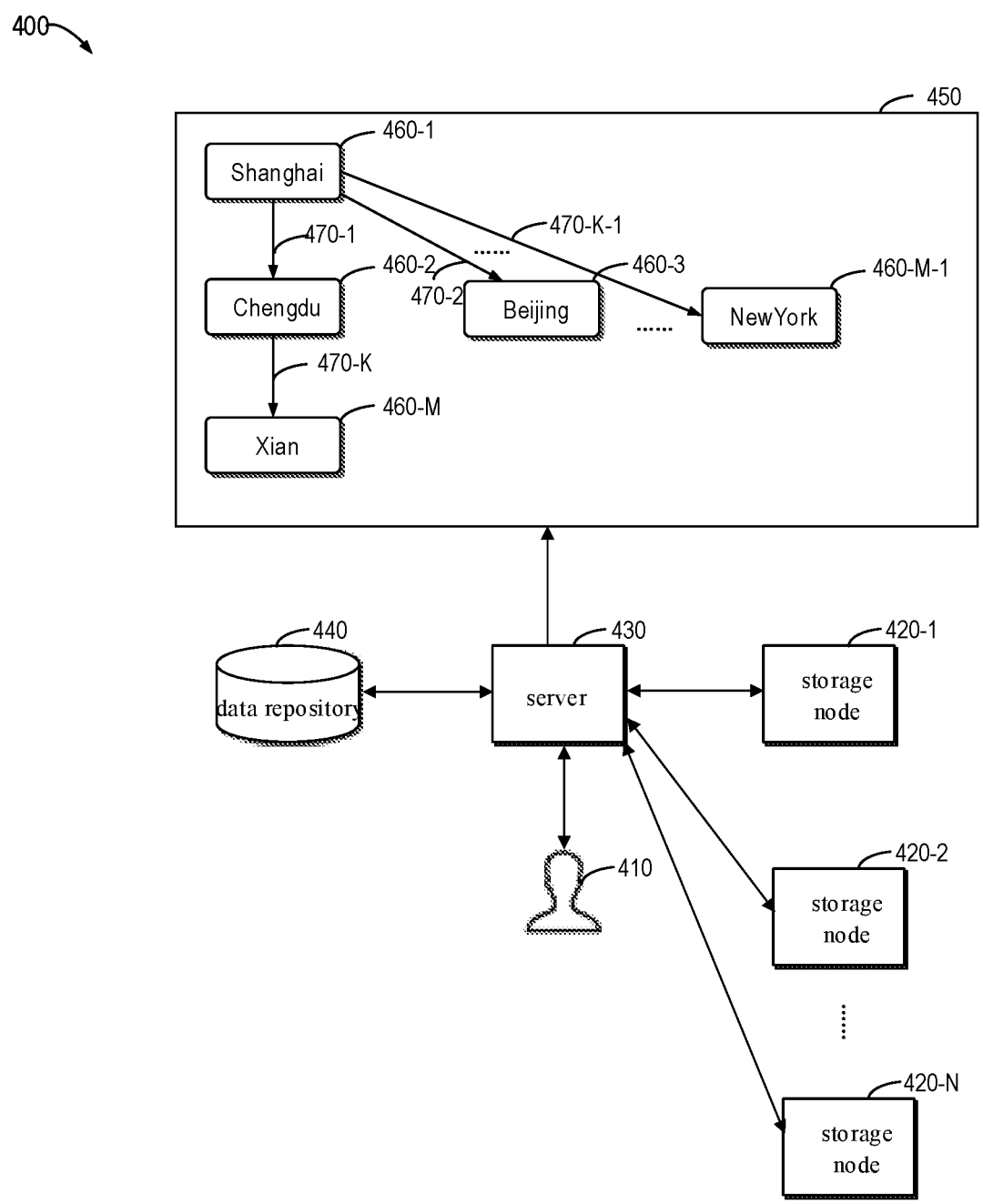
FIG. 4 illustrates a schematic diagram of an example environment in which a plurality of embodiments of the present disclosure can be implemented.

Embodiments of the present disclosure will be specifically described below with reference to the drawings. FIG. 4 illustrates a schematic diagram of an example environment 400 in which a plurality of embodiments of the present disclosure can be implemented. The example environment 400 may generally include a plurality of storage nodes 420-1, 420-2 to 420-N (for convenience of description, a plurality of storage nodes 420-1, 420-2 to 420-N may be collectively referred to as storage node 420), a server 430 and a data repository 440. It should be appreciated that structures and functions of the environment 400 are described for illustrative purposes only and are not intended to limit the scope of the present disclosure. Implementations of the present disclosure may also be applied into environments having different structures and/or functions.

There are two types of storage nodes in the storage node 420. One is a production node and the other is a backup node. The production node is one or more master computer devices running data processing applications which write data into storage nodes and read data from storage nodes. The backup node is a device storing replicated production node data. In normal operation, the production node is the source side of the environment 400 and the backup node is the destination side of the environment 400. The backup node is responsible for replicating the production node data. The direction of the replicated data stream is from the source side to the destination side. However, users can reverse the direction of the replicated data stream. In this case, the production node begins to behave as the destination backup node, and the backup node begins to behave as the source production node. This change in the direction of replication is referred to as "failover." Failover can be performed when a production node experiences a disaster or for other reasons. In certain data architectures, the storage node 420 can be manifested as a production node of a part of the storage data and meanwhile as a backup node of a further part of the storage data. In certain data architectures, a part of the storage data is replicated to the backup node, while the further part is not.

Production nodes and backup nodes can be remote from each other, or they can all be located on a local common node. Local data protection has the advantage of minimizing data latency between the destination and the source, while the remote data protection has the advantage of being more robustness in the event of a disaster at the source side.

The storage node 420 can communicate over Wide Area Network (WAN) to transmit data to the server 430 or receive data from the server 430, although other types of networks are also suitable for use with the present invention. The server 430 may include, for example, but is not limited to, any physical computer, virtual machine, or large-scale computing device provided by various service providers, etc. Although the storage node 420 and the server 430 are shown as devices separated from each other in FIG. 4, this is for the illustrative purposes only and does not imply any limitation to the scope of the present disclosure. In some example embodiments of the present disclosure, the storage node 420 and the server 430 may be implemented on the same physical device.

The server 430 can access the data repository 440 to store information therefrom or acquire the desired information therefrom. The data repository 440 can be, for example, any apparatuses or device for storing data. Although the server 430 and the data repository 440 are shown as being separated from each other in FIG. 4, this is for illustrative purposes only and is not intended to limit the scope of the present disclosure. In some example embodiments of the present disclosure, the storage repository 440 may be implemented in the server 430.

In some example embodiments of the present disclosure, the server 430 may provide, based on node information of a plurality of storage nodes 420 being acquired from the storage nodes 420 and replication relation information indicating the data replication relations, visual representations 450 associated with the plurality of storage nodes 420. For example, in the example of FIG. 4, the server 430 can generate a plurality of first visual representations 460-1, 460-2 to 460-M indicating a plurality of storage nodes in the storage system (for convenience of description, a plurality of first visual representations 460-1, 460-2 to 460-M may be collectively referred to as first visual representation 460) and a plurality of second visual representations 470-1, 470-2 to 470-K of a plurality of data replication relations between the plurality of storage nodes (for convenience of description, a plurality of second visual representations 470-1, 470-2 to 470-K may be collectively referred to as second visual representation 470). It should be understood that the visual representations shown are merely by way of example and the scope of the present disclosure is not limited in this respect.

Figure 5:
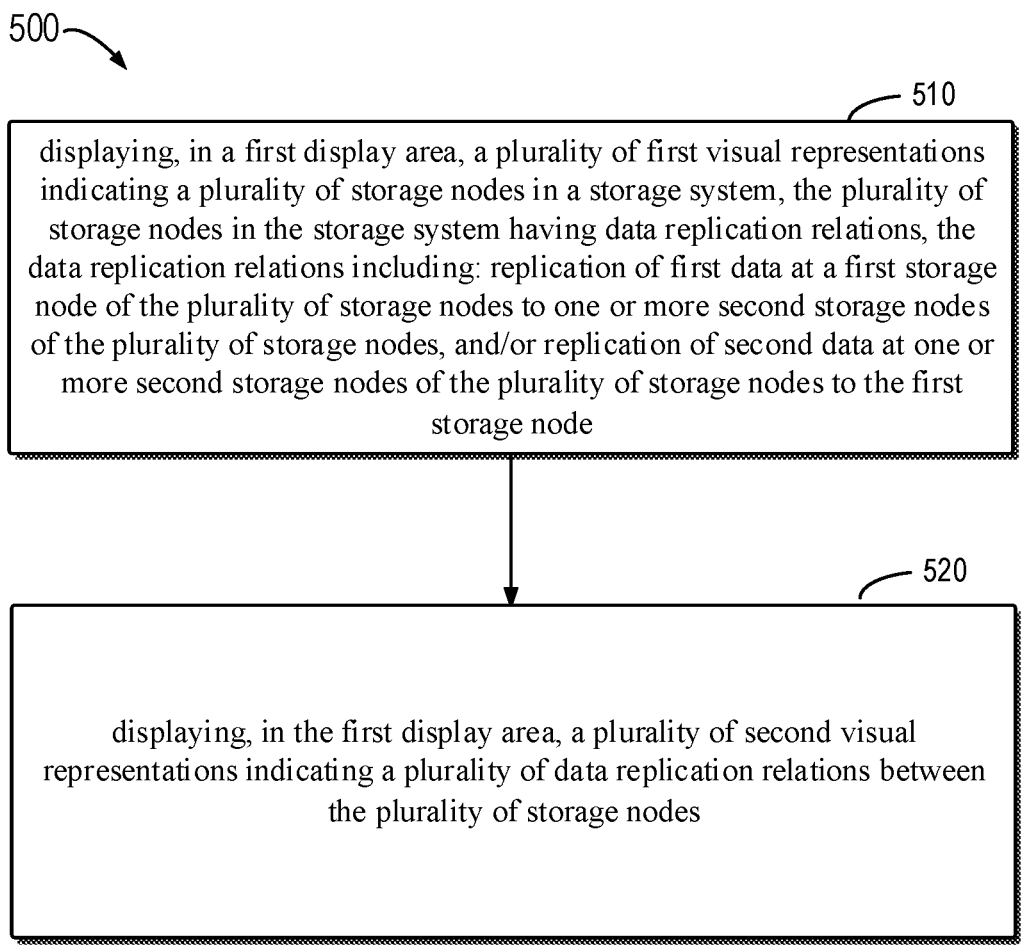
FIG. 5 illustrates a flowchart of a process for providing visual representations of data replication relations in accordance with embodiments of the present disclosure.

A solution for providing visual representations of data replication relations in accordance with the present disclosure will be described in more detail below with reference to FIG. 5. FIG. 5 illustrates a flowchart of a solution 500 for providing visual representations of data replication relations in accordance with some embodiments of the present disclosure. The solution 500 can be implemented by the server 430 of FIG. 4. For ease of discussion, the solution 500 will be described with reference to FIG. 4.

At block 510, the server 430 displays, in a first display area, a plurality of first visual representations 460 indicating a plurality of storage nodes 420 in the storage system. The plurality of storage nodes 420 in the storage system have data replication relations, the data replication relations include: replication of first data at a first storage node (e.g., 420-1) of the plurality of storage nodes 420 to one or more second storage nodes of the plurality of storage nodes 420, and/or replication of second data at one or more second storage nodes of the plurality of storage nodes 420 to the first storage node 420-1. Specifically, to protect the user from the influence of the primary storage node interruption, the storage nodes in the storage system can remotely replicate data to other storage nodes in the storage system. In addition, the primary storage node needs to perform some special operations in some cases, e.g., version update or maintenance, etc. In this case, it is required to replicate the data locally within the primary storage node. Therefore, a plurality of storage nodes 420 in the storage system have multiple remote data replication relations and/or local data replication relations.

In some example embodiments of the present disclosure, the first display area may be a display container of a predetermined size for presenting visual representations of the data replication relations. Examples of the first display area may include, but are not limited to, a page or a dialog on a display of the server 430. In some example embodiments of the present disclosure, the server 430 may present the data replication relations to the user 410 on a user interface of the centralized management software.

In some example embodiments of the present disclosure, a plurality of storage nodes 420 in the storage system may be identified by node information. Examples of the node information may include, but are not limited to, name, role and ID of the storage nodes. In some example embodiments of the present disclosure, in order to visualize the storage nodes, storage nodes may be indicated by visual representations (hereinafter referred to as first visual representations for convenience of description) based on the node information. In some example embodiments of the present disclosure, the first visual representation 460 may employ texts, icons or graphics which are capable of indicating storage nodes, such as a disk-like icon or square. In some example embodiments of the present disclosure, the first visual representation 460 may also include the node information of the storage nodes, e.g., displaying the name or ID of the storage node and the like in the icon or the graphic. It should be appreciated that types and/or forms of expressions and the like of the first visual representation 460 indicating the storage nodes should not be limited to the scope of the above examples of the present disclosure. The first visual representation may be of any types and/or forms of expressions which enable the user to intuitively recognize the storage nodes in the topology view.

At block 520, the server 430 displays, in the first display area, a plurality of second visual representations 470 indicating a plurality of data replication relations between the plurality of the storage nodes 420. As described above, there are a plurality of remote data replication relations between a plurality of storage nodes 420 in the storage system. In some example embodiments of the present disclosure, the remote data replication relations existing between a plurality of storage nodes 420 may be identified by the replication relation information indicating the data replication relations, and examples of the replication relation information may include, but are not limited to, name or ID of the source storage nodes and name or ID of the destination storage nodes, such as source storage node name 110 and destination storage node name 150 in FIG. 1. In some example embodiments of the present disclosure, to visualize the data replication relations between a plurality of storage nodes 420, the data replication relations may be indicated by visual representations (hereinafter referred to as second visual representations for convenience of description) based on the replication relation information. In some example embodiments of the present disclosure, the second visual representation 470 can employ a line or an icon which are capable of connecting two objects and pointing from one object to another, e.g., a line with an arrow. It should be understood that types and/or forms of expressions and the like of the second visual representation 470 indicating the data replication relations should not be limited to the scope of the above examples of the present disclosure. The second visual representation may be of any type and/or form of expressions which enables the user to intuitively recognize the pointing from one storage node to a further storage node in the topology view.

Although the display of the first visual representations and the display of the second visual representations are respectively described when describing the solution 500, it should be appreciated that this is merely an example process presented for ease of description. Those skilled in the art will appreciate that the first visual representations and the second visual representations may also be displayed simultaneously, or displayed in any other suitable manner. The scope of the present disclosure is not limited in this respect.

In some example embodiments of the present disclosure, the server 430 is capable of displaying the first visual representations indicating a plurality of storage nodes in the storage system and the second visual representations indicating data replication relations between a plurality of storage nodes, such that a topology view may be provided to visualize the plurality of storage nodes configured with replications in the storage system and the replication relations between the storage nodes, so that the user can quickly understand the replication relationships between the storage nodes, improving the efficiency and accuracy of user management and control of data replications between the storage nodes.

Figure 6:
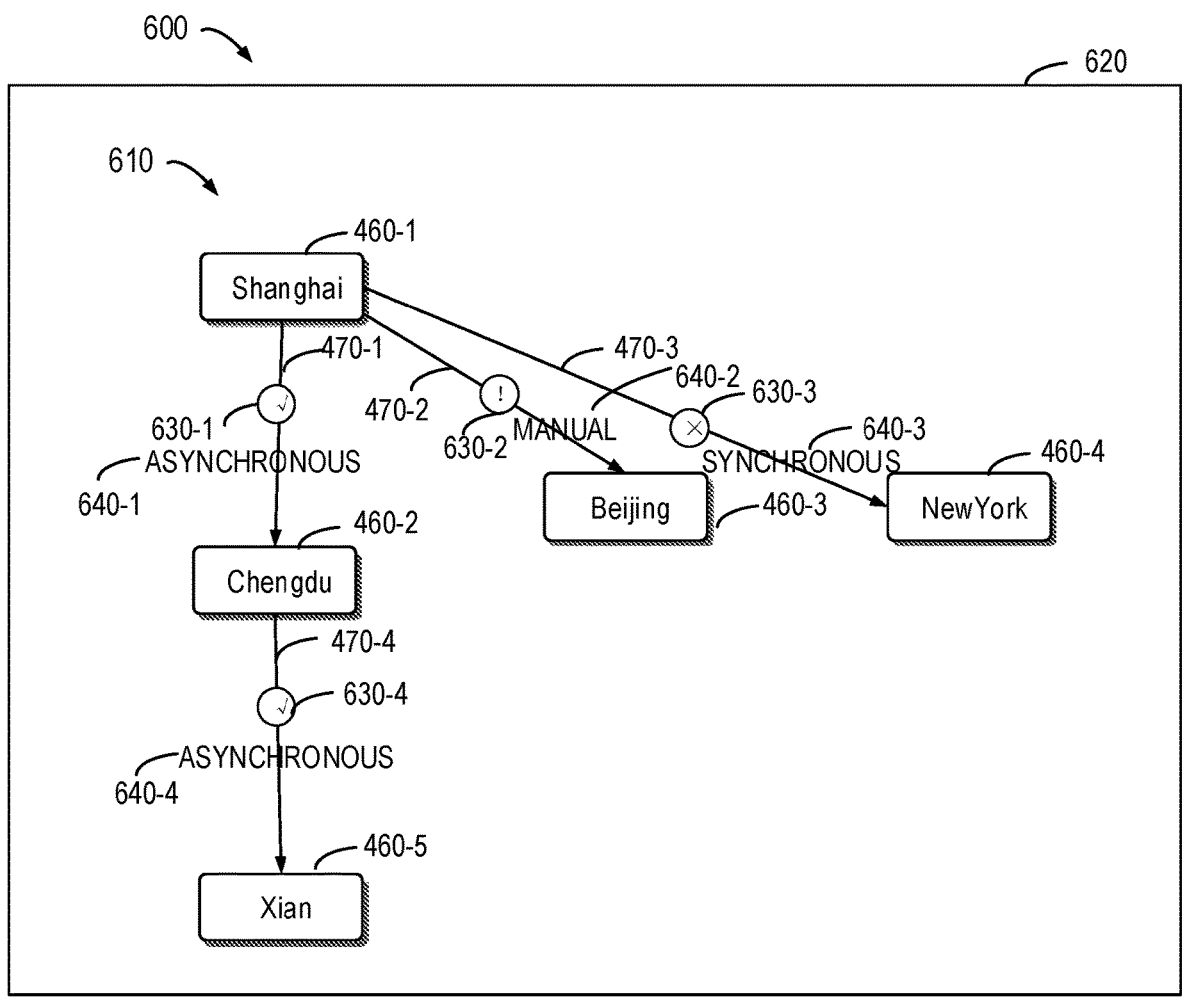
FIG. 6 illustrates a schematic diagram of an example visual representation in accordance with embodiments of the present disclosure.

FIG. 6 illustrates a schematic diagram 600 of an example visual representation in accordance with embodiments of the present disclosure. For example, a final visual representation of a plurality of storage nodes and their replication relations is illustrated as visual representation 610. In the example of FIG. 6, it is assumed that there are 5 storage nodes (such as, storage nodes 420-1 to 420-5) in the storage system with data replication relations between them, 5 first visual representations (e.g., first visual representations 460-1 to 460-5) indicating the 5 storage nodes and 4 second visual representations (e.g., second visual representations 470-1 to 470-4) indicating the replication relations between the storage nodes may be displayed in the first display area 620. FIG. 6 employs a rectangular box as the first visual representation 460 and displays the name of the storage node in the rectangular box, e.g., "Shanghai," "Chengdu," "Beijing," "Xian" or "New York", and the like. In addition, FIG. 6 uses a line with an arrow as the second visual representation 470 to connect two first visual representations to embody there is a replication between the two corresponding storage nodes indicated by the two first visual representations, the direction of the arrow represents the direction of replication. For example, as shown in FIG. 6, the second visual representations 470-1, 470-2 to 470-3 respectively indicate that there are data in the storage node "Shanghai" being replicated to storage node "Chengdu," storage node "Beijing" and storage node "New York." Meanwhile, the second visual representation 470-4 indicates that there are data in storage node "Chengdu" being replicated to storage node "Xian." Although 5 storage nodes are shown in FIG. 6 and the data replication relations between them is displayed in a tree-like topology, this is for illustrative purposes only and does not imply any limitation on the scope of the present disclosure. In some other example embodiments of the present disclosure, any number of storage nodes may be displayed and displayed in other topological forms according to the data replication relations between them, such as mesh-like or star-like, and the like.

In this way, the user can be provided with visual representations 450 associated with a plurality of storage nodes 420 in which all storage nodes configured with data replications are displayed in the visual representations 450 and the replication relations between the storage nodes are clearly described.

In some example embodiments of the present disclosure, the server 430 may acquire, from a plurality of storage nodes 420, node information of the plurality of storage nodes and replication relation information indicating data replication relations, such that the server 430 can generate a plurality of first visual representations 460 and a plurality of second visual representations 470 based on the node information and the replication relation information. In some example embodiments of the present disclosure, centralized management software is installed on the server 430, and the user 410 can operate the centralized management software via the server 430. For example, the user 410 can view basic information, such as aggregated states, alerts, node details, performance and capacity metrics, and storage usage information of the storage nodes 420, and the like on the centralized management software. In some example embodiments of the present disclosure, a plurality of storage nodes 420 may be registered into the centralized management software, and the centralized management software running on the server 430 may request the node information of the storage nodes 420 and the replication relation information indicating the data replication relations of the storage nodes 420 from the management software on the registered storage nodes 420. Examples of the node information may include, but are not limited to, name, role or ID of the storage node, and the like; examples of the replication relation information may include, but are not limited to, source storage node name 110, source storage resource name 120, source storage resource type 130, replication mode 140, destination storage node name 150, destination storage resource name 160, state 170 and session name 180 in FIG. 1. In addition, the above information may be acquired by any means, including but not limited to the scope of the above examples of the present disclosure, for example, by way of storage node reporting or by reading scripts/configuration files/command files. After the node information and the replication relation information are acquired, the server 430 can know which storage nodes in the storage system have data replication relations and the data replication relations between the storage nodes, such that the server 430 can generate the first visual representations 460 indicating the storage nodes and the second visual representations 470 indicating a plurality of data replication relations between the plurality of storage nodes.

In some example embodiments of the present disclosure, in order to be able to update the visual representations 450 indicating a plurality of storage nodes in the storage system and a plurality of data replication relations between the plurality of storage nodes in real time, the server 430 may periodically acquire the node information indicating the storage nodes 420 and the replication relation information indicating the data replication relations of the storage nodes 420. It should be understood that a value of the period of acquiring the information should not be too long, e.g., 5 minutes, and the value is only by way of example and not limiting. Other embodiments of the present disclosure also may use other suitable values.

In some example embodiments of the present disclosure, the server 430 displays, based on the periodically acquired node information of the storage nodes 420 and the replication relation information indicating the data replication relations of the storage nodes 420, the storage nodes and the data replication relations between them, such that the displayed topology view can reflect the data replication relations between respective storage nodes in the storage system in real time.

In some example embodiments of the present disclosure, the server 430 may also display a plurality of third visual representations associated with a plurality of second visual representations 470 in the first display area 620, wherein the third visual representations indicate states of replication links between the respective storage nodes having the replication relations. There may be multiple states of the replication links between the storage nodes, e.g., data being transmitted, links being disconnected, links being normal, and alerts, etc. As described above, the server 430 may acquire, from a plurality of storage nodes 420, the node information of the plurality of storage nodes and the replication relation information indicating the data replication relations, wherein the replication relation information includes the states of the replication links between the respective storage nodes having the replication relations, such as state 170 in FIG. 1. In some example embodiments of the present disclosure, to visualize the states of the replication links between the respective storage nodes having the replication relations, the states of the replication links can be indicated by visual representations (hereinafter referred to as third visual representations for convenience of description) based on the state information in the replication relation information. In some example embodiments of the present disclosure, the server 430 may display, in the first display area 620, the third visual representations around or on the second visual representations 470, to indicate the states of the replication links between the respective storage nodes having the replication relations. In some example embodiments of the present disclosure, the third visual representations may employ symbols or icons capable of indicating the states of the replication links between the respective storage nodes, for example "√" and icons with "√" or icons displayed with state name (such as an icon displayed with "Lost Communication" or "Auto Sync Configured"). The third visual representations also can be displayed in combination with the second visual representations, for example, adding different colors to the arrows in the second visual representations as the third visual representations to indicate a predetermined replication link state. It should be appreciated that types and/or forms of expressions of the third visual representation indicating the states of the replication links should not be limited to the scope of the above examples of the present disclosure. The third visual representation may be of any type and/or form of expressions which enables the user to intuitively recognize the states of the replication links between the respective storage nodes in the topology view.

Continue with the example of FIG. 6, 4 third visual representations 630-1, 630-2 to 630-4 (for convenience of description, third visual representations 630-1, 630-2 to 630-4 may be collectively referred to as third visual representation 630) can be displayed on 4 second visual representations (e.g., second visual representations 470-1 to 470-4) in the first display area 620. FIG. 6 uses icons with "√" and "x" as the third visual representations 630. For example, the third visual representations 630-1 and 630-4 "√" are displayed on the second visual representations 470-1 and 470-4 to indicate that the current state of the data replication link between the storage node "Shanghai" and the storage node "Chengdu" and the current state of the data replication link between the storage node "Chengdu" and the storage node "Xian" are normal. The third visual representation 630-2 "!" is displayed on the second visual representation 470-2 to indicate that the current state of the data replication link between the storage node "Shanghai" and the storage node "Beijing" is an alert. The third visual representation 630-3 "x" is displayed on the second visual representation 470-3 to indicate that the current state of the data replication link between the storage node "Shanghai" and the storage node "New York" is disconnected. In addition, "LOST COMMUNICATION," "Auto Sync Configured" or "IDLE" and the like may also be included in the second visual representation 470 to indicate the states of the data replication links between respective storage nodes, respectively.

In this way, the user can know the current state of each data replication link while obtaining the data replication relations between a plurality of storage nodes, so that data replication can be controlled for the current state of the link.

In some example embodiments of the present disclosure, the server 430 may display the third visual representations in combination with the second visual representations, to further indicate the states of the replication links between the respective storage nodes having the replication relations. In some example embodiments of the present disclosure, the third visual representations may be of different styles and/or colors of the second visual representations and the third visual representations based on the second visual representations 470 are thus utilized to indicate the states of the replication links between the respective storage nodes having the replication relations. In an example where the second visual representation 470 is denoted in a line, the third visual representation may be defined as follows: a red line indicating that the current state of the replication link is disconnected; a green line indicating that the current state of the replication link is normal; a bolded line indicating that the current state of the replication link is being transmitted.

In some example embodiments of the present disclosure, if data of the storage node A is replicated to the storage node B and data of the storage node B is also replicated to the storage node A simultaneously, the data replication relation from the storage node A to the storage node B and the data replication relation from the storage node B to the storage node A may be indicated respectively by two second visual representations. Alternatively, two data replication links between the storage node A and the storage node B also can be indicated simultaneously by a second visual representation of a particular style and/or color. In an example where the second visual representation 470 is also denoted in a line, the data replication relation from the storage node A to the storage node B and the data replication relation from the storage node B to the storage node A are indicated respectively by two lines with different arrows, or the two data replication links between the storage node A and the storage node B are indicated simultaneously by a line with arrows at both ends.

In some example embodiments of the present disclosure, the server 430 may also display, in the first display area 620, a plurality of fourth visual representations associated with a plurality of second visual representations 470, the fourth visual representations indicating data replication modes between the storage nodes having the replication relations. There may be multiple replication modes for data replications between the storage nodes, e.g., synchronous mode and asynchronous mode. In the asynchronous mode, automatic asynchronous replication and "Manual" may be further included. As mentioned above, the server 430 can acquire, from a plurality of storage nodes 420, the node information of the plurality of storage nodes and the replication relation information indicating the data replication relations, wherein the replication relation information includes data replication modes between the respective storage nodes having the replication relations, such as, the replication mode 140 in FIG. 1. In some example embodiments of the present disclosure, to visualize the data replication modes between the corresponding storage nodes having replication relations, the data replication modes may be indicated by the visual representations (hereinafter referred to as fourth visual representations for convenience of description) based on the replication mode information in the replication relation information. In some example embodiments of the present disclosure, the server 430 may display, in the first display area 620, the fourth visual representations around or on the second visual representations 470 to indicate the data replication modes between the respective storage nodes having the replication relations. In some example embodiments of the present disclosure, the fourth visual representations may employ symbols or icons capable of indicating the data replication modes between the respective storage nodes, e.g., an icon displayed with a text description of the corresponding replication mode. It should be appreciated that types and/or forms of expressions and the like of the fourth visual representations indicating the data replication modes should not be limited to the scope of the above examples of the present disclosure. The fourth visual representations may be of any type and/or forms of expression that enables the user to intuitively recognize the data replication modes between the corresponding storage nodes in the topology view.

Continue with the example of FIG. 6, 4 fourth visual representations 640-1, 640-2 to 640-4 (for convenience of description, fourth visual representations 640-1, 640-2 to 640-4 may be collectively referred to as fourth visual representation 640) can be displayed on 4 second visual representations (e.g., second visual representations 470-1 to 470-4) in the first display area 620. FIG. 6 uses an icon displayed with a text as the fourth visual representations 640. For example, fourth visual representations 640-1 and 640-4 "ASYNCHRONOUS" are displayed on the second visual representations 470-1 and 470-4 to indicate that the data replication mode between the storage node "Shanghai" and the storage node "Chengdu" and the data replication mode between the storage node "Chengdu" and the storage node "Xian" are asynchronous mode. The fourth visual representation 640-2 "Manual" is displayed on the second visual representation 470-2 to indicate that the data replication mode between the storage node "Shanghai" and the storage node "Beijing" is manual trigger in the asynchronous mode. The fourth visual representation 640-3 "SYNCHRONOUS" is displayed on the second visual representation 470-3 to indicate that the data replication mode between the storage node "Shanghai" and the storage node "New York" is synchronous mode.

In this way, in addition to obtaining the data replication relations between a plurality of storage nodes and the current state of each data replication link, the data replication mode also can be known to provide sufficient information and a better experience for the user.

In some example embodiments of the present disclosure, the server 430 may also display the fourth visual representations in combination with the second visual representations to further indicate the data replication modes between the respective storage nodes having the replication relations. In some example embodiments of the present disclosure, the fourth visual representations may be of different formats and/or colors of the second visual representations. The fourth visual representations based on the second visual representations 470 are thus utilized to indicate the data replication modes between the respective storage nodes having the replication relations. In an example where the second visual representation 470 is denoted in a line, the fourth visual representations may be defined as follows: a yellow line indicating that the data replication mode is synchronous mode; a blue line indicating that the data replication mode is asynchronous mode, or a solid line indicating that the replication mode between the two storage nodes is asynchronous mode; a dotted line indicating that the replication mode between two storage nodes is synchronous mode. In some example embodiments of the present disclosure, if both the synchronous mode and the asynchronous mode are supported between two storage nodes, the server 430 may also indicate two different modes by a fourth visual representation which is displayed in combination with two separate second visual representations 470.

In some example embodiments of the present disclosure, in response to a first visual representation of the plurality of first visual representations being selected by a user, the server 430 can display a storage resource list of the selected first visual representation in a second display area, the storage resource list including a first storage resource storing first data and a storage resource type of the first storage resource and/or a second storage resource storing second data and a storage resource type of the second storage resource. Continue with the example of FIG. 6 after completing the display of the first visual representations 460 and the second visual representations 470, the user can select one (e.g., first visual representation 460-1) of the first plurality of visual representations 460 displayed in the first display area 620. For example, the user can select the first visual representation 460-1 by clicking or inputting. In some example embodiments of the present disclosure, the server 430 may determine, based on the node information and the replication relation information associated with the first storage node indicated by the first visual representation 460-1, all storage resources participating in the data replications on the first storage node and storage resource types.

As described above, the server 430 can acquire, from a plurality of storage nodes 420, the node information of the storage nodes 420 and the replication relation information indicating the data replication relations. In some example embodiments of the present disclosure, the server 430 may extract, from the acquired information indicating the replication relations of the storage nodes 420, first replication relation information of whether there are replication relations between the first storage node and other storage nodes of the plurality of storage nodes 420. Subsequently, the server 430 may determine, based on the first replication relation information, all storage resources participating in the replications on the selected first storage node and storage resource types of the storage resources. In some example embodiments of the present disclosure, for example, the server 430 may determine, according to "source storage resource name 120" and "source storage resource type 130" in the first replication relation information, all storage resources participating in the replication on the selected first storage node and the storage resource types of the storage resources.

In some example embodiments of the present disclosure, the server 430 may display a storage resource list associated with the selected first storage node in a display area (hereinafter referred to as a second display area for convenience of description) different from the display area 620, wherein the second display area may be, but is not limited to, a page or a dialog box. By providing these storage resource information, the server 430 can make it easier for the users to acquire a detailed replication configuration of the storage nodes that the user cares about.

Figure 7:
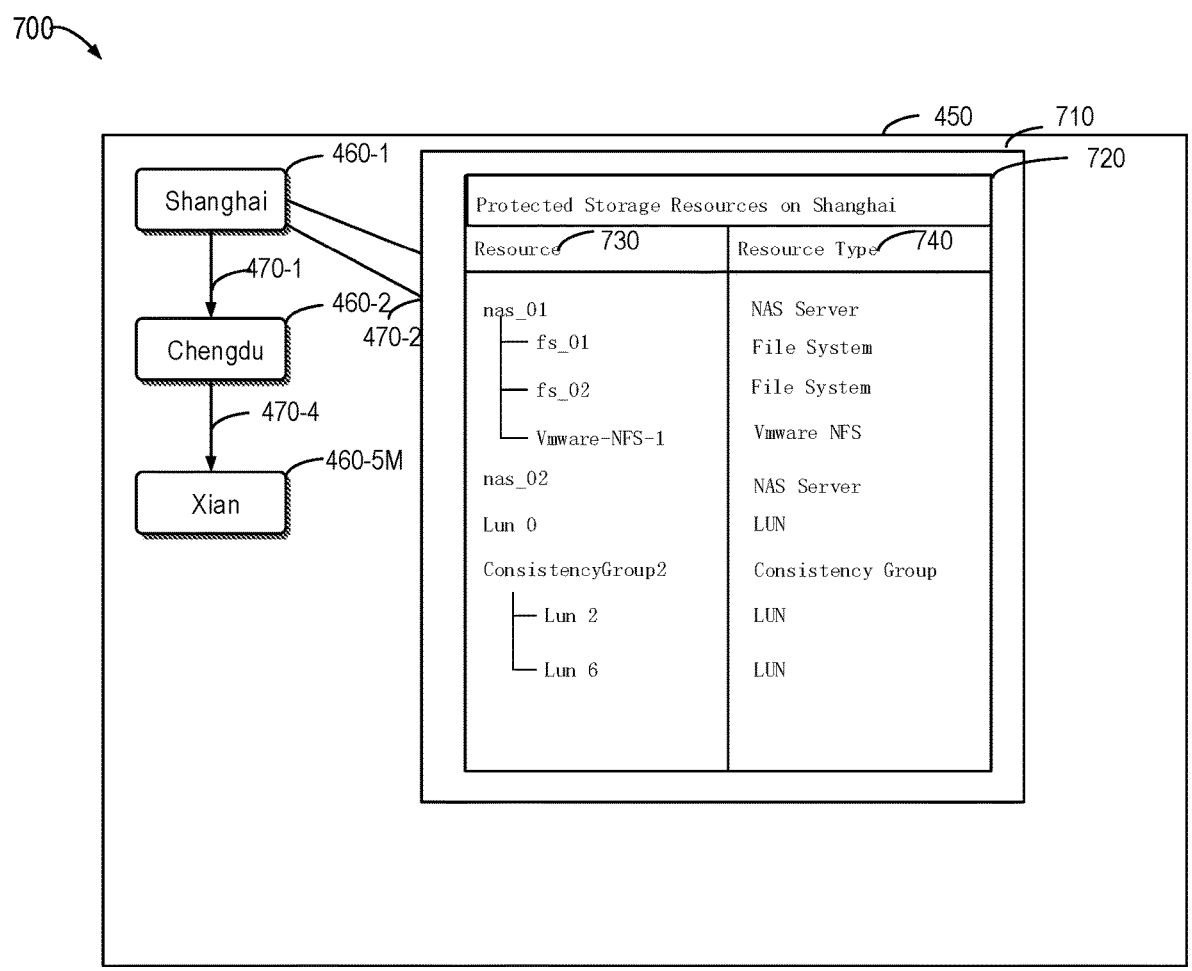
FIG. 7 illustrates a schematic diagram of an example visual representation in accordance with embodiments of the present disclosure.

FIG. 7 illustrates a schematic diagram 700 of an example visual representation in accordance with embodiments of the present disclosure. The difference from FIG. 6 is that FIG. 7 further displays in the second display area 710 a storage resource list 720 of the first storage node indicated by the selected first visual representation 460-1, the storage resource list 720 listing all storage resource names 730 participating in the replication on the selected first storage node and storage resource types 740 of the storage resources. For example, as shown in FIG. 7, on the selected first storage node, there is a storage resource whose storage resource name 730 is "nas_01", and the storage resource type 740 is "NAS Server," wherein "nas_01" includes the resource type 740 being "fs_01" and "fs_02" of the file system and "Vmware-NFS-1" of the resource type Vmware NFS.

In some example embodiments of the present disclosure, in response to a storage resource in the storage resource list 720 being selected by the user, the server 430 may display in a third display area: a plurality of visual representations indicating a plurality of storage nodes including the selected storage resource; a plurality of fifth visual representations indicating the selected storage resource in the plurality of first visual representations; and a plurality of sixth visual representations between the plurality of fifth visual representations, the plurality of sixth visual representations indicating the data replication relations associated with the selected storage resource. As mentioned above, in the example of FIG. 6, a plurality of storage nodes configured with replications in the storage system and the replication relations of the storage nodes are shown, but FIG. 6 shows the replication relations between the storage nodes and the user cannot determine the replication relations of a certain data from the visualization topology of FIG. 6. In some example embodiments of the present disclosure, the server 430 may provide, for a specified storage resource on a certain storage node, the replication relations of the storage resource between a plurality of storage nodes.

Continue with the example of FIG. 7, after completing the display of the storage resource list 720, the user may select one (such as the storage resource whose storage resource name 730 is "nas_01") of a plurality of storage resources displayed in the storage resource list 720. For example, the user can select the storage resource "nas_01" by clicking or inputting. The server 430 may determine, based on the replication relation information associated with the storage resource "nas_01", all of the replication sessions in which the storage resource "nas_01" participates.

As described above, the server 430 can acquire, from a plurality of storage nodes 420, the node information of the storage nodes 420 and the replication relation information indicating the data replication relations. In some example embodiments of the present disclosure, the server 430 may extract, from the acquired information indicating the replication relations of the storage nodes 420, the replication relation information related to the selected storage resource "nas_01," such as the source storage node name 110, the destination storage node name 150, the source storage resource name 120, and the destination storage resource name 160 in FIG. 1. Subsequently, the server 430 may determine, based on the replication relation information related to the selected storage resource "nas_01," a plurality of storage nodes related to the storage resource "nas_01" and the data replication relations between the plurality of storage nodes. Accordingly, the server 430 can generate a plurality of first visual representations 460 indicating a plurality of storage nodes including the selected storage resource "nas_01" and a plurality of fifth visual representations indicating the selected storage resource "nas_01" in the plurality of first visual representations 460. Besides, the server 430 may display, in a display area (hereinafter referred to as a third display area for convenience of description) different from the first display area 620 and the second display area 710, a plurality of first visual representations including the fifth visual representations and the plurality of fifth visual representations. The third display area can be, but is not limited to, a page or a dialog box. Furthermore, in some example embodiments of the present disclosure, the fifth visual representation may adopt an icon or a graphic capable of indicating the storage resource, such as a folder-like icon or square. In some example embodiments of the present disclosure, the fifth visual representation may also include storage resource information, for example, displaying name or ID of the storage resource or the like in or around the icon or the graphic. It should be understood that types and/or forms of expressions of the fifth visual representations or the like indicating the storage resource should not be limited to the scope of the above examples of the present disclosure. The fifth visual representations can be of any type and/or form of expressions that enables the user to intuitively recognize the storage resource in the topology view.

As described above, there are a plurality of storage nodes associated with the selected storage resource "nas_01" and the data replication relations of the storage resource "nas_01" between a plurality of storage nodes. In some example embodiments of the present disclosure, to visualize the data replication relations of the storage resource "nas_01" between a plurality of storage nodes, the data replication relations between the storage resources may be indicated by the visual representations (hereinafter referred to as sixth visual representations for convenience of description) based on the replication relation information. In some example embodiments of the present disclosure, the server 430 may connect a plurality of fifth visual representations by the sixth visual representations in the third display area to embody a plurality of data replication links of the selected storage resource "nas_01" between different storage nodes. The types and/or the forms of expressions of the sixth visual representations, which are similar to those of the second visual representations 470, can refer to the previous descriptions of the second visual representations in the example of block 520 of the solution 500 and will not be repeated herein.

Figure 8:
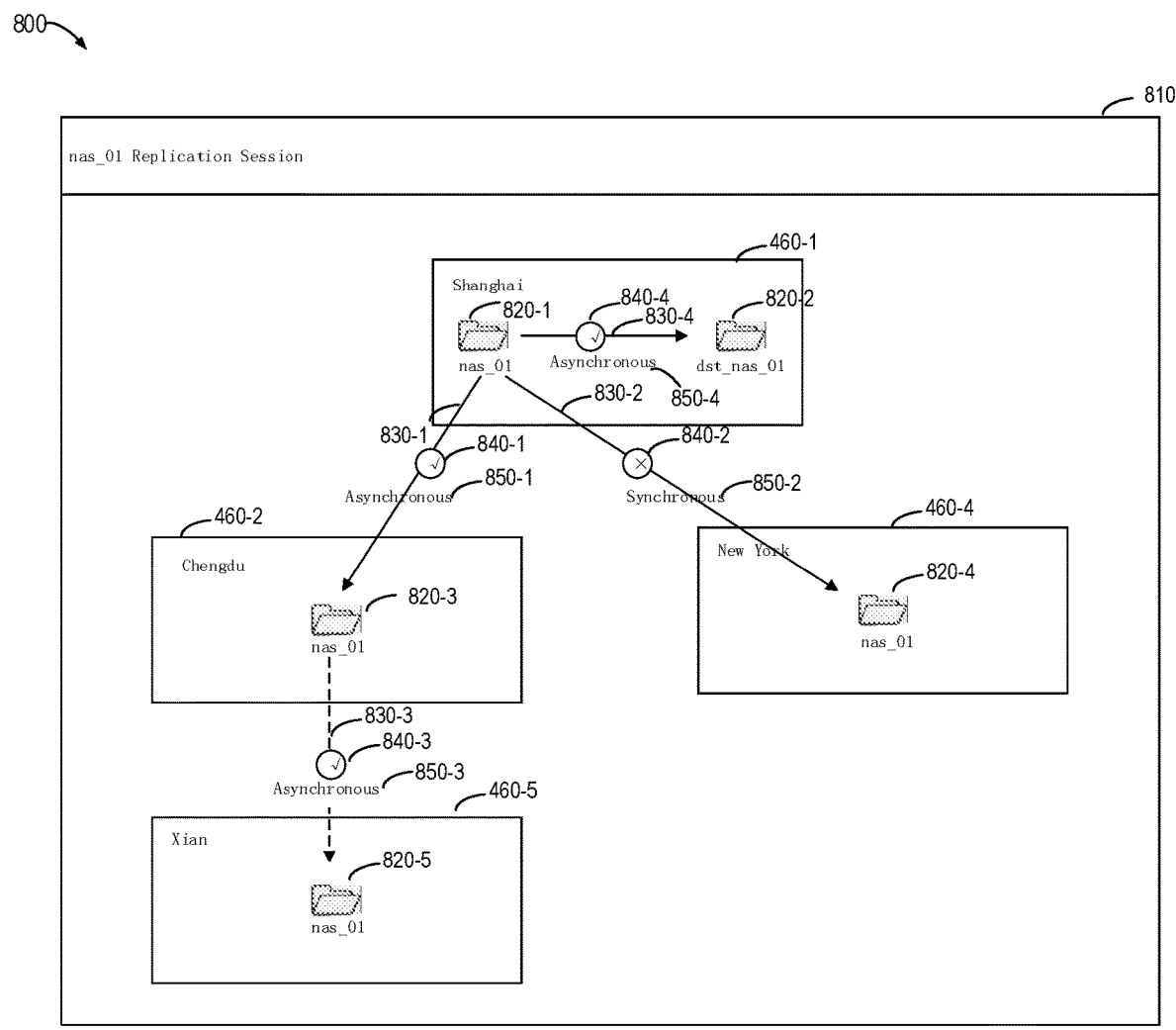
FIG. 8 illustrates a schematic diagram of an example visual representation in accordance with embodiments of the present disclosure.

FIG. 8 illustrates a schematic diagram 800 of an example visual representation in accordance with embodiments of the present disclosure. For the selected storage resource "nas_01," in the example of FIG. 8, a plurality of first visual representations 460 indicating a plurality of storage nodes including the selected storage resource "nas_01" are displayed in the third display area 810; a plurality of fifth visual representations 820-1, 820-2 to 820-5 (for convenience of description, the plurality of fifth visual representations 820-1, 820-2 to 820-5 may be collectively referred to as the fifth visual representation 820) indicating the selected storage resource in the plurality of first visual representations; and a plurality of sixth visual representations 830-1, 830-2 to 830-4 between the plurality of fifth visual representations (for convenience of description, a plurality of sixth visual representations 830-1, 830-2 to 830-4 may be collectively referred as the sixth visual representation 830), the plurality of sixth visual representations 830 indicating the data replication relations associated with the selected storage resource. For example, in FIG. 8, the sixth visual representations 830-1, 830-2 to 830-3 are displayed to indicate that the selected storage resource "nas_01" is replicated from the storage node "Shanghai" to the storage node "Chengdu" and to the storage node "New York" respectively, and also replicated from the storage node "Chengdu" to the storage node "Xian." In addition, FIG. 8 also displays the sixth visual representation 830-4, which indicates that the selected storage resource "nas_01" is locally replicated at the local storage node "Shanghai." The local replication has the advantage of minimizing the data latency between the destination and the source. When the local storage nodes need to execute some other operations, the current data can be temporarily backed up by the local replication.

By providing these replication session information, the server 430 can monitor all replication sessions in the storage system, enabling the user to manage and control the data replications across the storage nodes in units of storage resources.

In some example embodiments of the present disclosure, the server 430 may display, in the third display area 810, a plurality of seventh visual representations 840-1, 840-2 to 840-4 (for convenience of description, a plurality of seventh visual representations 840-1, 840-2 to 840-4 may be collectively referred to as the seventh visual representation 840) associated with the sixth visual representations 830, the seventh visual representations 840 indicating states of replication links of the selected storage resource between the respective storage nodes. In some example embodiments of the present disclosure, the server 430 may display the seventh visual representations in combination with the sixth visual representations to further indicate the state of the replication link of the selected storage resource between the respective storage nodes. The types and/or the forms of expressions of the seventh visual representations 840, which are similar to those of the third visual representations 480, can refer to the previous descriptions of the third visual representations in the example of the solution 500 and will not be repeated herein. For example, as shown in FIG. 8, the seventh visual representations 840-1, 840-3 and 840-4 "√" are displayed on the sixth visual representations 830-1, 830-3 and 830-4 to indicate that the current state of the respective data replication links of the selected storage resource "nas_01" between the storage node "Shanghai" and the storage node "Chengdu," between the storage node "Chengdu" and the storage node "Xian" and locally at the storage node "Shanghai" are normal. The seventh visual representation 840-2 "x" is displayed on the sixth visual representation 830-2 to indicate that the current state of the data replication link of the selected storage resource "nas_01" between the storage node "Shanghai" and the storage node "New York" is disconnected.

In this way, the user can know the current state of each data replication link while obtaining the replication sessions associated with a certain storage resource, so that a more accurate replication operation can be performed.

In some example embodiments of the present disclosure, the server 430 also can display, in the third display area 810, a plurality of eighth visual representations 850-1, 850-2 to 850-4 (for convenience of description, a plurality of eighth visual representations 850-1, 850-2 to 850-4 may be collectively referred to as the eighth visual representation 850) associated with the sixth visual representations 830, the eighth visual representations 850 indicating data replication modes of the selected storage resource between the respective storage nodes. In some example embodiments of the present disclosure, the server 430 may display the eighth visual representations in combination with the sixth visual representations to further indicate the data replication modes of the selected storage resource between the respective storage nodes. The types and/or the forms of expressions of the eighth visual representations 850, which are similar to those of the fourth visual representations 490, can refer to the previous descriptions of the fourth visual representations in the example of the solution 500 and will not be repeated herein. For example, as shown in FIG. 8, a plurality of eighth visual representations 850-1, 850-3 to 850-4 "Asynchronous" are displayed on the sixth visual representations 830-1 to 830-3 to indicate that the data replication modes of the selected storage resource "nas_01" between the storage node "Shanghai" and the storage node "Chengdu," between the storage node "Chengdu" and the storage node "Xian" and locally at the storage node "Shanghai" is asynchronous mode. The eighth visual representation 850-2 "Synchronous" is displayed on the sixth visual representation 830-2 to indicate that the local replication mode on the storage nodes "Shanghai" and "New York" for the selected storage resource "nas_01" is synchronous mode. In this way, the user can also know the data replication mode of each replication session while obtaining the replication sessions associated with a certain storage resource.

Figure 9:
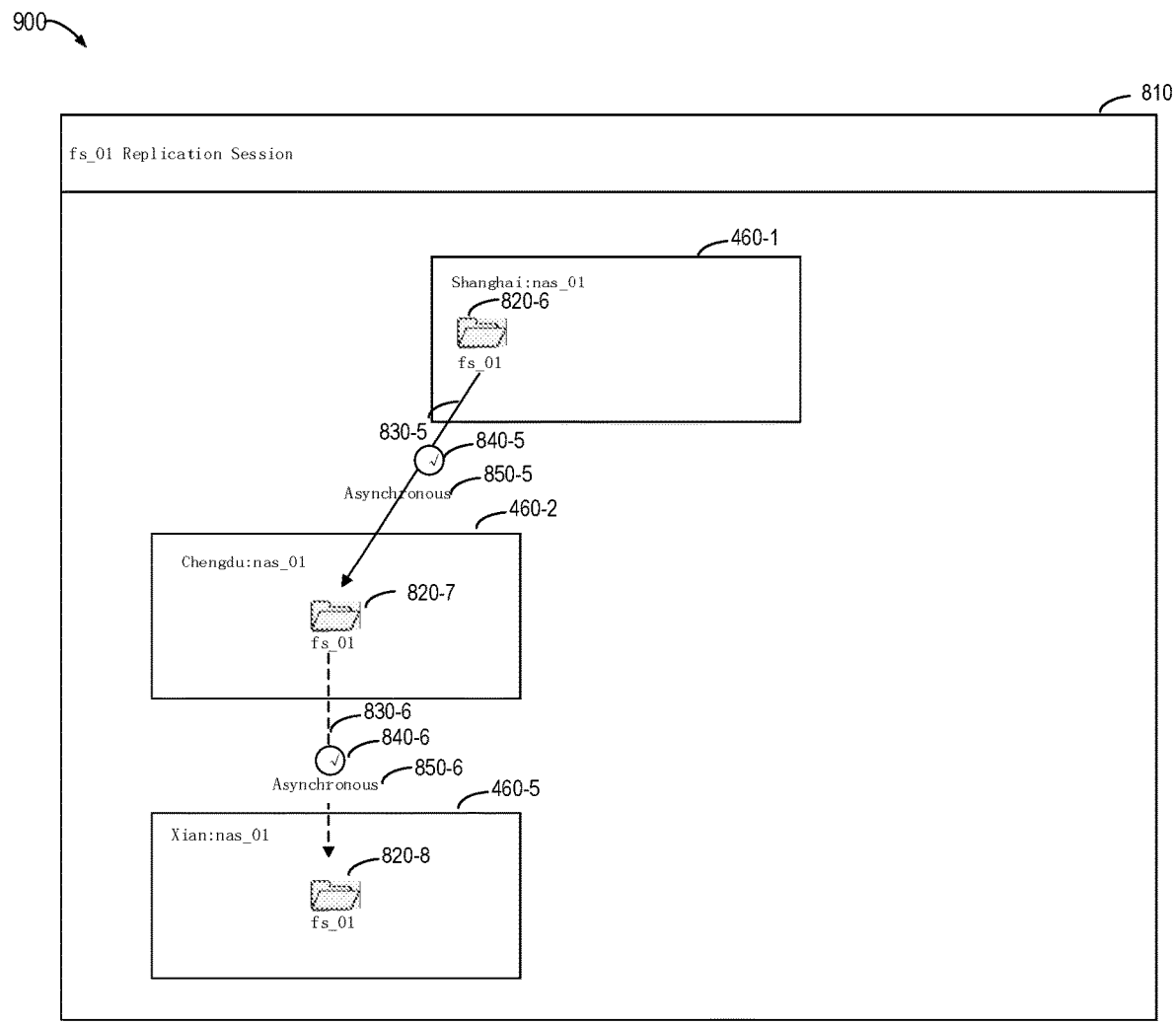
FIG. 9 illustrates a schematic diagram of an example visual representation in accordance with embodiments of the present disclosure.

FIG. 9 illustrates a schematic diagram 900 of an example visual representation in accordance with embodiments of the present disclosure. FIG. 9 differs from FIG. 8 in that FIG. 9 displays for the selected the storage resource name 730 being the storage resource "fs_01" in "nas_01." In the example of FIG. 9, for the selected storage resource "fs_01," a plurality of first visual representations 460 indicating a plurality of storage nodes including the selected storage resource "fs_01" are displayed in the third display area 810; a plurality of fifth visual representations 820-6 to 820-8 indicating the selected storage resource in the plurality of first visual representations; and a plurality of sixth visual representations 830-5 and 830-6 between the plurality of fifth visual representations, the plurality of sixth visual representations 830 indicating the data replication relations associated with the selected storage resource. For example, in FIG. 9, it is displayed that the selected storage resource "fs_01" is replicated from the storage node "Shanghai" to the storage node "Chengdu", and is also replicated from the storage node "Chengdu" to the storage node "Xian." In addition, FIG. 9 also displays the seventh visual representations 840-5 and 840-6 to indicate that the current states of the respective data replication links of the selected storage resource "fs_01" between the storage node "Shanghai" and the storage node "Chengdu" and between the storage node "Chengdu" and the storage node "Xian" are normal. FIG. 9 also displays the eighth visual representations 850-5 and 850-6 to indicate that the data replication modes of the selected storage resource "fs_01" between the storage node "Shanghai" and the storage node "Chengdu" and between the storage node "Chengdu" and the storage node "Xian" are asynchronous mode.

Based on the above method, by providing a topology view to visualize a plurality of storage nodes configured with replications in the storage system and the replication relations between the storage nodes, the defect that the existing replication configuration and management lacks direct summary of all storage nodes and storage resources participating in the joint replication can be overcome. Therefore, the user can quickly understand the replication relations between the storage nodes to improve the efficiency and the accuracy when the user manages and controls the data replications across the storage nodes.

In addition, the above method further provides a replication session topology view for a certain storage resource. The topology view specifically displays the data replication relations, the link states and the data replication modes of a certain storage resource between a plurality of storage nodes, such that the server can not only monitor all storage nodes, but also the replication sessions of the storage resources on a certain storage node, thereby providing sufficient information and a better experience for the user.

Figure 10:
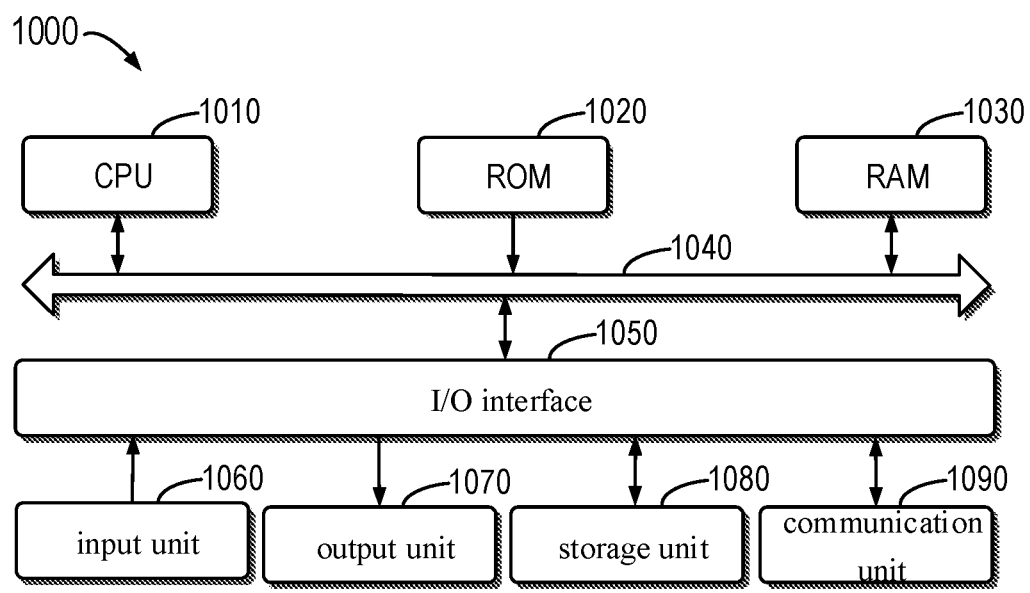
FIG. 10 illustrates a schematic block diagram of an example device that can be used to implement embodiments of the present disclosure.

FIG. 10 illustrates a schematic block diagram of an example device 1000 for implementing embodiments of the present disclosure. The device 1000 can be used for implementing the server 430 of FIG. 4. As shown, the device 1000 includes a central process unit (CPU) 1001, which can perform various appropriate actions and processing based on the computer program instructions stored in the read-only memory (ROM) 1002 or computer program instructions loaded in the random-access memory (RAM) 1003 from the storage unit 1008. In the RAM 1003, various programs and data required for the operation of the device 1000 can also be stored. CPU 1001, ROM 1002 and RAM 1003 are connected to each other via a bus 1004. The input/output (I/O) interface 1005 is also connected to the bus 1004.

A plurality of components in the device 1000 are connected to the I/O interface 1005, including: an input unit 1006, such as a keyboard, mouse, etc.; an output unit 1007, such as various types of displays, loudspeakers, etc.; a storage unit 108, such as disk and optical disk, etc.; and a communication unit 1009, such as a network card, a modem, a wireless transceiver, etc. The communication unit 1009 allows the device 1000 to exchange information/data with other devices via a computer network, such as the Internet, and/or various telecommunication networks.

The various procedure and processing described above, such as method 500, may be performed by the processing unit 1001. For example, in some example embodiments of the present disclosure, the method 500 can be implemented as a computer software program that is tangibly embodied in a machine-readable medium, such as storage unit 1008. In some example embodiments of the present disclosure, some or all of the computer program may be loaded and/or installed onto the device 1000 via ROM 1002 and/or communication unit 1009. When the computer program is loaded into RAM 1003 and executed by the CPU 1001, one or more actions of the method 500 described above may be performed.

The present disclosure can be a method, apparatus, system and/or computer program product. The computer program product can include a computer-readable storage medium, on which the computer-readable program instructions for performing various aspects of the present disclosure are loaded.

The computer-readable storage medium may be a tangible device that can maintain and store the instructions used by the instruction executing devices. The computer-readable storage medium can be, for example, but not limited to, an electrical storage device, a magnetic storage device, an optical storage device, an electromagnetic storage device, a semiconductor storage device, or any appropriate combination of the above. More specific examples (non-exhaustive list) of the computer-readable storage medium include: portable computer disks, hard disks, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disks, mechanical coding devices, such as a punched card or a bump structure in a slot on which instructions are stored, and any appropriate combinations of the above. The computer-readable storage medium as used herein is not to be interpreted as transient signals per se, such as radio waves or other freely propagated electromagnetic waves, electromagnetic waves propagated via waveguides or other transmission media (such as optical pulses via fiber-optic cables), or electric signals propagated via electric wires.

The computer-readable program instructions described herein can be downloaded from the computer-readable storage medium to each computing/processing device, or to an external computer or external storage device via a network, such as the Internet, a local area network, a wide area network and/or a wireless network. The network may include copper-transmitted cables, fiber optic transmissions, wireless transmissions, routers, firewalls, switches, gateway computers, and/or edges. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcodes, firmware instructions, state setting data, or source codes or object codes written in any combinations of one or more programming languages, wherein the programming languages include object-oriented programming languages, such as Smalltalk, C++ and so on, and traditional procedural programming languages, such as "C" language or similar programming languages. The computer-readable program instructions can be executed entirely on the user computer, partially on the user computer, as an independent software package, partially on the user computer and partially on the remote computer, or entirely on the remote computer. In the case of a remote computer, the remote computer can be connected to the user computer via any type of network, including a local area network (LAN) and wide area network (WAN), or to an external computer (e.g., using an Internet service provider to connect via the Internet). In some example embodiments of the present disclosure, state information of the computer-readable program instructions is used to customize an electronic circuit, e.g., programmable logic circuit, field programmable gate array (FPGA), or programmable logic arrays (PLAs). The electronic circuit can execute computer-readable program instructions to implement various aspects of the present disclosure.

Various aspects of the present disclosure are described herein with reference to flow charts and/or block diagrams of a method, apparatus (system) and computer program product according to embodiments of the present disclosure. It should be understood that each block of the flow charts and/or block diagrams and the combination of various blocks in the flow charts and/or block diagrams can be implemented by computer-readable program instructions.

These computer-readable program instructions can be provided to a processing unit of a general-purpose computer, dedicated computer or other programmable data processing apparatuses to produce a machine, such that the instructions that, when executed by a processing unit of a computer or other programmable data processing devices, produce an apparatus for implementing functions/acts specified in one or more of the blocks of the flow charts and/or block diagrams. The computer-readable program instructions can also be stored in a computer-readable storage medium and cause the computer, programmable data processing apparatus, and/or other devices to operate in a particular manner, such that the computer-readable medium storing the instructions includes an article of manufacture that includes instructions for implementing various aspects of the functions/acts specified in one or more blocks of the flow charts and/or block diagrams.

The computer-readable program instructions can also be loaded onto a computer, other programmable data processing apparatuses, or other devices, so as to perform a series of operational steps on a computer, other programmable data processing apparatuses, or other devices to perform a series of operational steps on a computer, to produce a computer-implemented process. Therefore, the instructions executed on a computer, other programmable data processing apparatuses, or other devices implement functions/acts specified in one or more blocks of the flow charts and/or block diagrams.

The flow charts and block diagrams in the drawings illustrate system architecture, functions and operations possibly implemented by systems, methods and computer program products according to multiple embodiments of the present disclosure. In this regard, each block in the flow chart or block diagram can represent a module, a program segment, or a portion of an instruction, wherein the module, the program segment, or a portion of an instruction includes one or more executable instructions for implementing the specified logic functions. In some alternative implementations, the functions indicated in the block may also take place in a different order than that indicated in the drawings. For example, two consecutive blocks may be executed substantially in parallel, and they may sometimes be executed in a reverse order, dependent upon the functions involved. It should also be noted that each block of the block diagrams and/or flow charts, and combinations of the blocks of the block diagrams and/or flow charts, can be implemented in a dedicated hardware-based system that performs the specified functions or acts, or can be implemented in a combination of dedicated hardware and computer instructions.

Various embodiments of the present disclosure have been described above and the above description is only by way of example rather than exhaustive and is not limited to the disclosed embodiments. Many modifications and alterations, without deviating from the scope and spirit of the explained various embodiments, are obvious for those skilled in the art. The selection of terms used herein is intended to best explain the principles, practical applications, or improvements to the technology in the market of each embodiment, or to enable those ordinary skilled in the art to understand the various embodiments disclosed herein.

We claim:

1. A method of providing visual representations of data replication relations, comprising:
    displaying, in a first display area, a plurality of first visual representations indicating a plurality of storage nodes in a storage system, the plurality of storage nodes in the storage system having data replication relations, the data replication relations including:
    at least one of: (i) replication of first data at a first storage node of the plurality of storage nodes to one or more second storage nodes of the plurality of storage nodes, and (ii) replication of second data at one or more second storage nodes of the plurality of storage nodes to the first storage node;
    displaying, in the first display area, a plurality of second visual representations indicating a plurality of data replication relations between the plurality of storage nodes; and
    displaying, in the first display area, a plurality of third visual representations associated with the plurality of second visual representations, the third visual representations indicating states of replication links between the storage nodes having the replication relations.

2. The method of claim 1, further comprising:
    acquiring, from the plurality of storage nodes, node information of the plurality of storage nodes and replication relation information indicating the data replication relations; and
    generating, based on the node information and the replication relation information, the plurality of first visual representations and the second visual representations.

3. The method of claim 1, further comprising:
    displaying the third visual representations in combination with the second visual representations to indicate the states of the replication links between the storage nodes having the replication relations.

4. The method of claim 1, further comprising:
    displaying, in the first display area, a plurality of fourth visual representations associated with the plurality of second visual representations, the fourth visual representations indicating data replication modes between the storage nodes having the replication relations.

5. The method of claim 4, further comprising:
    displaying the fourth visual representations in combination with the second visual representations to indicate the data replication modes between the storage nodes having the replication relations.

6. The method of claim 5, further comprising:
    in response to a first visual representation of the plurality of first visual representations being selected by a user, displaying, in a second display area, a storage resource list of the selected first visual representation, the storage resource list including a first storage resource storing the first data and a storage resource type of the first storage resource and/or a second storage resource storing the second data and a storage resource type of the second storage resource.

7. The method of claim 6, further comprising:
    in response to a storage resource in the storage resource list being selected by the user, displaying in a third display area:
    a plurality of first visual representations indicating a plurality of storage nodes including the selected storage resource;
    a plurality of fifth visual representations indicating the selected storage resource in the plurality of first visual representations; and
    a plurality of sixth visual representations between the plurality of fifth visual representations, the plurality of sixth visual representations indicating the data replication relations associated with the storage resource.

8. The method of claim 7, further comprising:
    displaying, in the third display area, a plurality of seventh visual representations associated with the sixth visual representations, the seventh visual representations indicating states of replication links of the selected storage resource between the storage nodes.

9. The method of claim 8, further comprising:
    displaying the seventh visual representations in combination with the sixth visual representations to indicate the state of the replication link of the selected storage resource between the storage nodes.

10. The method of claim 7, further comprising:
displaying, in the third display area, a plurality of eighth visual representations associated with the sixth visual representations, the eighth visual representations indicating data replication modes of the selected storage resource between the storage nodes.

11. The method of claim 10, further comprising:
displaying the eighth visual representations in combination with the sixth visual representations to indicate the data replication modes of the selected storage resource between the storage nodes.

12. An apparatus for providing visual representations of data replication relations, comprising:
a processor; and
a memory coupled to the processor, the memory having instructions stored therein, wherein the instructions, when executed by a processor, cause the apparatus to perform acts comprising:
displaying, in a first display area, a plurality of first visual representations indicating a plurality of storage nodes in a storage system, the plurality of storage nodes in the storage system having data replication relations, the data replication relations including:
at least one of: (i) replication of first data at a first storage node of the plurality of storage nodes to one or more second storage nodes of the plurality of storage nodes, and (ii) replication of second data at one or more second storage nodes of the plurality of storage nodes to the first storage node;
displaying, in the first display area, a plurality of second visual representations indicating a plurality of data replication relations between the plurality of storage nodes; and
displaying, in the first display area, a plurality of third visual representations associated with the plurality of second visual representations, the third visual representations indicating states of replication links between the storage nodes having the replication relations.

13. The apparatus of claim 12, wherein the acts further comprise:
acquiring, from the plurality of storage nodes, node information of the plurality of storage nodes and replication relation information indicating the data replication relations; and
generating, based on the node information and the replication relation information, the plurality of first visual representations and the second visual representations.

14. The apparatus of claim 12, wherein the acts further comprise:
displaying the third visual representations in combination with the second visual representations to indicate the states of the replication links between the storage nodes having the replication relations.

15. The apparatus of claim 12, wherein the acts further comprise:
displaying, in the first display area, a plurality of fourth visual representations associated with the plurality of second visual representations, the fourth visual representations indicating data replication modes between the storage nodes having the replication relations.

16. The apparatus of claim 15, wherein the acts further comprise:
displaying the fourth visual representations in combination with the second visual representations to indicate the data replication modes between the storage nodes having the replication relations.

17. The apparatus of claim 16, wherein the acts further comprise:
in response to a first visual representation of the plurality of first visual representations being selected by a user, displaying, in a second display area, a storage resource list of the selected first visual representation, the storage resource list including a first storage resource storing the first data and a storage resource type of the first storage resource and/or a second storage resource storing the second data and a storage resource type of the second storage resource.

18. A non-transitory computer-readable medium having computer-readable instructions stored thereon, the computer-readable instructions, when executed, causing a device to:
display, in a first display area, a plurality of first visual representations indicating a plurality of storage nodes in a storage system, the plurality of storage nodes in the storage system having data replication relations, the data replication relations including:
at least one of: (i) replication of first data at a first storage node of the plurality of storage nodes to one or more second storage nodes of the plurality of storage nodes, and (ii) replication of second data at one or more second storage nodes of the plurality of storage nodes to the first storage node;
display, in the first display area, a plurality of second visual representations indicating a plurality of data replication relations between the plurality of storage nodes; and
display, in the first display area, a plurality of third visual representations associated with the plurality of second visual representations, the third visual representations indicating states of replication links between the storage nodes having the replication relations.

* * * * *